US006677041B1

(12) United States Patent
Ogawa et al.

(10) Patent No.: US 6,677,041 B1
(45) Date of Patent: Jan. 13, 2004

(54) PLATY POTASSIUM TITANATE, PROCESS FOR PRODUCING THE SAME, AND FRICTION MATERIAL

(75) Inventors: Hiroshi Ogawa, Tokushima (JP); Shigeo Takahashi, Tokushima (JP); Nobuki Itoi, Tokushima (JP); Kousuke Inada, Tokushima (JP)

(73) Assignee: Otsuka Chemical Co., Ltd., Osaka (JP)

( * ) Notice: Subject to any disclaimer, the term of this patent is extended or adjusted under 35 U.S.C. 154(b) by 0 days.

(21) Appl. No.: 09/936,715

(22) PCT Filed: Mar. 16, 2000

(86) PCT No.: PCT/JP00/01617

§ 371 (c)(1),
(2), (4) Date: Sep. 17, 2001

(87) PCT Pub. No.: WO00/55093

PCT Pub. Date: Sep. 21, 2000

(30) Foreign Application Priority Data

Mar. 16, 1999 (JP) .......................... 11-070917
Oct. 7, 1999 (JP) .......................... 11-287259

(51) Int. Cl.$^7$ ............................... B32B 5/66
(52) U.S. Cl. .................. 428/402; 428/323; 428/332; 106/428; 106/430; 106/436
(58) Field of Search ................... 428/402, 323, 428/332; 106/428, 430, 436

(56) References Cited

U.S. PATENT DOCUMENTS 5,084,422 A * 1/1992 Harada et al. ............... 501/95

FOREIGN PATENT DOCUMENTS

| JP | 06-009948 | * | 1/1994 |
| JP | 06-032998 | * | 2/1994 |
| JP | 06-136275 | * | 5/1994 |
| JP | 06-329862 | * | 11/1994 |
| JP | 10-139431 | * | 5/1998 |

* cited by examiner

Primary Examiner—Leszek Kiliman
(74) Attorney, Agent, or Firm—Townsend & Banta (57) ABSTRACT

Platy potassium titanate having a mean major diameter of 1–100 μm and a mean aspect ratio of 3–500 and obtainable by subjecting magnesium or lithium potassium titanate to an acid treatment to thereby prepare platy titanate, immersing the platy titanate in a potassium hydroxide solution and then subjecting it to calcination.

32 Claims, 6 Drawing Sheets

PLATY POTASSIUM TITANATE, PROCESS FOR PRODUCING THE SAME, AND FRICTION MATERIAL

TECHNICAL FIELD

The present invention relates to platy potassium octatitanate, platy potassium hexatitanate, platy potassium tetratitanate, processes of producing them and friction materials.

BACKGROUND ART

Potassium octatitanate ($K_2O.8TiO_2$), potassium hexatitanate ($K_2O.6TiO_2$) and potassium tetratitanate ($K_2O.4TiO_2$) are generally produced in the form of fibrous compounds and widely used as resin reinforcers and friction materials for their superior crystal strength and high heat-insulating abilities.

However, conventional potassium octatitanate, potassium hexatitanate and potassium tetratitanate, because of their fibrous form, suffer from the following problems: they are bulky; they exhibit poor flowability; and they tend to get stuck on a wall of a feed passage during manufacture to eventually block it. In the resin reinforcer application, they show insufficient reinforcing performances against the force exerted in a direction of torsion. Further in the friction material application, it has been demanded that they are provided in the platy form advantageous to insure a high effect at frictional surfaces.

However, potassium octatitanate, potassium hexatitanate and potassium tetratitanate have not been provided in the platy form up to date, due to their favored crystal growth mechanism by which they are crystalized into the fibrous form.

DISCLOSURE OF THE INVENTION

It is an object of this invention to provide platy potassium octatitanate, platy potassium hexatitanate and platy potassium tetratitanate, processes for producing them and friction materials utilizing them.

The term "platy potassium titanate" will be hereinafter used collectively in describing the matters common to platy potassium octatitanate, platy potassium hexatitanate and platy potassium tetratitanate.

The platy potassium titanate of the present invention is characterized as having a mean major diameter of 1–100 μm and an aspect ratio of 3–500.

The process of producing the platy potassium titanate is characterized in that platy titanate is immersed in a potassium hydroxide solution and subsequently calcined.

Examples of useful platy titanates include those obtained by subjecting platy magnesium potassium titanate or platy lithium potassium titanate to an acid treatment.

In the production process of the present invention, a calcination temperature is preferably maintained within the range of 400–700° C., more preferably within the range of 400–650° C., further preferably within the range of 450–650° C., further preferably within the range of 500–650° C. for the case of platy potassium octatitanate. In the case of platy potassium hexatitanate, it is preferably maintained within the range of 600–800° C. In the case of platy potassium tetratitanate, it is preferably maintained within the range of 700–800° C.

The friction material of the present invention is characterized as containing the platy potassium titanate as a friction control agent. Preferably, the platy potassium titanate is contained in the friction material in the amount of 3–50% by weight.

BEST MODE FOR CARRYING OUT THE INVENTION

The platy potassium titanate of the present invention is a platy substance having a mean major diameter of 1–100 μm, preferably 3–30 μm, and a mean aspect ratio of 3–500, preferably 3–100, further preferably 5–20. The mean major diameter, as used herein, refers to a so-called mean particle diameter and its value is determined as a median diameter by a laser diffraction particle-size distribution analyzer. The mean aspect ratio refers to a ratio (mean major diameter/ mean minor diameter) of the mean major diameter to a mean minor diameter (thickness). The mean aspect ratio can be determined by measuring the mean minor diameter (thickness) utilizing a scattering electron microscope and then calculating its ratio to the mean major diameter. In this case, measurement is generally made for about 20 particles having appreciable thicknesses within a visual field of the scattering electron microscope and then an arithmetic mean of the measured minor diameters is calculated. Preferably, the mean minor diameter (thickness) is in the approximate range of 50–1,000 nm.

The process for producing platy potassium titanate, in accordance with the present invention, is characterized as including the steps of immersing platy potassium titanate in a potassium hydroxide solution to intercalate potassium ions and then performing calcination. The platy potassium titanate can be obtained by providing a compound from which anions present between its layers can be deintercalated by an acid treatment and. subjecting the compound to such an acid treatment. Examples of such compounds include platy magnesium potassium titanate, platy lithium potassium titanate and the likes These compounds can be produced in accordance with such techniques as disclosed in Japanese Patent Laying-Open No. Hei 5-221795 and Japanese Patent Application No. Hei 11-158086 filed by the applicant of the present application.

The platy magnesium potassium titanate can be obtained by combining respective sources of titanium, potassium and magnesium, adding a flux thereto, effecting thorough mixing hereof and then achieving calcination of the mixture at 1,000–1,100° C. for the duration of 1–8 hours.

The titanium source can be optionally chosen from compounds containing titanium oxide. Specific examples of titanium sources include titanium oxide, rutile ores, titanium hydoxide wet cake and hydrated titania.

The potassium source can be chosen from compounds which produce potassium oxide when exposed to heat. Specific examples of potassium sources include potassium oxide, potassium carbonate, potassium hydroxide, potassium nitrate and the like. Among them, potassium carbonate is preferred.

Examples of magnesium sources include magnesium hydroxide, magnesium carbonate, magnesium fluoride and the like.

As a standard, those titanium, potassium and magnesium sources are blended in the ratio of Ti:K:Mg=4:2:1 (molar ratio). However, each source is permitted to vary within a deviation of about 5%. If the blending ratio deviates largely from the above-specified standard, the unfavorable deposition of $K_2MgTi_7O_{16}$ sometimes results which is a non-platy side product.

Examples of fluxes include potassium chloride, potassium fluoride, potassium molybdenate, potassium tungstenate and the like. Among them, potassium chloride is preferred.

The flux is added to the above raw material in the molar ratio (raw material:flux) of 3:1–3:15, preferably 3:3–3:10. It becomes economically advantageous when a decreasing amount of the flux is added. However, if its amount is reduced excessively, the platy crystal structure may unfavorably collapse.

Calcination can be performed by using an optional technique such as an electric furnace or muffle furnace. For mass production, a procedure is preferably utilized which involves press-forming the prepared raw material into a shape of a brick or cylinder and calcining the shaped raw material in a tunnel kiln.

Preferably, calcination is achieved between 1,000–1,100° C. for the duration of 1–24 hours. The rate at which temperature is raised or reduced is not particularly specified, but is generally preferably in the range of 3–7° C./min. A larger size platy product is obtained with an increasing calcination temperature, but the calcination temperature of exceeding 1,100° C. is generally undesired because the product is caused to melt at such a temperature to impair its shape. The longer duration of calcination results in obtaining larger size particles.

After calcination, the product may be subjected to wet disintegration whereby it is crushed and ground such as by a jaw crusher and a pin mill and dispersed in water to form an about 5–10% slurry which is subsequently stirred. When necessary, the disintegrated product is further classified, filtered and dried to obtain platy magnesium potassium titanate. This platy magnesium potassium titanate has a mean major diameter in the approximate range of 3–30 μm and is suitable for use as relatively small-sized raw material for the platy potassium titanate of the present invention.

Lithium potassium titanate can be produced, for example, by combining respective sources of titanium, potassium and magensium, adding a flux thereto, effecting thourough mixing thereof and then maintaining the mixture at 825–1,150° C. for the duration of 1–12 hours.

Applicable titanium and potassium sources and fluxes were described previously in describing the production of magnesium potassium titanate.

Applicable lithium sources can be suitably chosen from compounds which produce lithium oxide when heated. Examples include lithium carbonate, lithium nitrate and the like.

As a standard, those titanium, potassium and magnesium sources are blended in the ratio of Ti:K:Mg=1.73:0.8:0.27 (molar ratio). However, each source is permitted to vary within a deviation of about 5%. Preferably, the flux is added to a unit mass of the raw material in the ratio of 1–4 (molar ratio). The addition of the flux in an excessively small amount results in the failure to obtain platy product. On the other hand, it becomes economically disadvantageous when an excessively larger amount of the flux is added.

The disintegrating, classifying, filtering and drying steps may be effected by the same means as employed in the production of the magnesium potassium titanate.

The resulting lithium potassium titanate has a mean major diameter in the approximate range of 10–100 μm and is suitable for use as relatively large-sized raw material for the platy potassium titanate of the present invention.

Examples of acids used to treat these compounds for deintercalation include mineral acids such as sulfuric acid, nitric acid and hydrochloric acid. Preferably, the acid treatment is acomplished by continuing stirring until anions present between layers of the compound are allowed to elute almost completely from a 1 mole/liter (1 N) solution of such an acid. Stirring is generally continued for about 5–8 hours.

The platy titanate obtained is then washed with water and transferred to the following potassium ion intercalation step. A choice of specific conditions of the steps which follow the intercalation step determines the type of the platy titanate produced; platy potassium octatitanate, platy potassium hexatitanate or platy potassium tetratitanate. The cases where the platy potassium octatitanate, platy potassium hexatitanate and platy potassium tetratitanate are produced may be below described separately.

Production of Platy Potassium Octatitanate

The intercalation of potassium ions can be performed in the following manner. The above-obtained platy titanate is formed into an about 1–30%, preferably about 5–20%, aqueous potassium hydroxide slurry and then stirred. The stirring is continued while the concentration of potassium hydroxide in the slurry is maintained at a slurry pH of not less than 11.5 but below 13, preferably not less than 12 but below 13, more preferaly around 12. During the stirring, potassium hydroxide may be added, if necessary, to maintain the slurry pH within the specified range. The stirring is preferably continued for 1 hour or longer, more preferably 5–10 hours.

If the pH exceeds 13, the subsidiary production of potassium hexatitanate may increase in the next step. If the pH falls below 11.5, the subsidiary production of potassium titanate may increase. Accordingly, neither case is desired.

After completion of the intercalation, the slurry is filtered, washed with water and dried. The subsequent calcination at a temperature of 400–700° C., preferably 400–650° C., more preferably 450–650° C., further preferably 500–650° C., results in obtaining platy potassium octatitanate. Calcination can be effected in tunnel kilns such as an electric kiln, muffle kiln and rotary kiln, rotating kilns and the like.

If the calcination temperature falls below 400° C., a moisture may remain in the crystal. On the other hand, if it exceeds 700° C., the subsidiary production of titanium oxide potassium hexatitanate may increase. Accordingly, neither case is desired.

Production of Platy Potassium Hexatitanate

The intercalation of potassium ions can be performed in the following manner. The above-obtained platy titanate is formed into an about 1–30%, preferably about 5–20%, aqueous potassium hydroxide slurry and then stirred. The stirring is continued while the concentration of potassium hydroxide in the slurry is maintained at a slurry pH of not less than 13.5 but below 14, preferably around 13.75. During the stirring, potassium hydroxide may be added, if necessary, to maintain the slurry pH within the specified range. The stirring is preferably continued for 1 hour or longer, more preferably 5–10 hours.

If the pH exceeds 14, the subsidiary production of potassium hexatitanate and potassium dititanate may increase in the next step. If the pH is below 13.5, the subsidiary production of potassium titanate may increase in the next step. Accordingly, neither case is desired.

After completion of the potassium ion intercalation, the slurry is filtered, washed with water and dried. The subsequent calcination at 600–800° C. results in obtaining platy potassium hexatitanate. Calcination can be effected in tunnel kilns such as an electric kiln, muffle kiln and rotary kiln, rotating kilns and the like. The calcination duration is preferably 3 hours or longer.

If the calcination temperature falls below 600° C., a crystal structure is in some cases unchanged to stay in the form of lepidocrocite to result in the failure to obtain potassium hexatitanate. On the other hand, if it exceeds 800° C., columnar or fibrous crystals, instead of platy crystals, are sometimes produced. Accordingly, neither case is desired.

Production of Platy Potassium Tetratitanate

The intercalation of potassium ions can be performed in the following manner. The above-obtained platy titanate is formed into an about 1–30%, preferably about 5–20%, aqueous potassium hydroxide slurry and then stirred. The stirring is continued while the concentration of potassium hydroxide in the slurry is maintained at a slurry pH of not less than 14.5 but below 16.3, preferably in the approximate range of 15.0–15.5. During the stirring, potassium hydroxide may be added, if necessary, to maintain the slurry pH within the specified range. The stirring is preferably continued for 1 hour or longer, more preferably 5–10 hours.

If the pH exceeds 16.3, the subsidiary production of potassium dititanate may increase in the next step. If the pH is below 14.5, the subsidiary production of potassium hexatitanate may increase in the next step. Accordingly, neither case is desired.

After completion of the potassium ion intercalation, the slurry is filtered, washed with water and dried. The subsequent calcination at 700–800° C. results in obtaining platy potassium tetratitanate. Calcination can be effected in tunnel kilns such as an electric kiln, muffle kiln and rotary kiln, rotating kilns and the like. The calcination duration is preferably 3 hours or longer.

If the calcination temperature falls below 700° C., a crystal structure is in some cases unchanged to take the form of lepidocrocite, resulting either in the failure to obtain potassium tetratitanate or in the deposition of potassium dititanate. On the other hand, if it exceeds 800° C., columnar or fibrous crystals, instead of platy crystals, are sometimes produced. Accordingly, neither case is desired.

In the intercalation step, potassium hydroxide may be used in the form of a powder, pellet, aqueous solution or the like. Exemplary forms include an 85 wt. % pellet and a 5–48 wt. % aqueous solution. The form of potassium hydroxide, e.g., a powder, pellet, aqueous solution or other form, may be suitably chosen depending upon the target pH value of the aqueous solution.

For convenience to those skilled in the art, the standard potassium hydroxide concentrations needed in each intercalation step for adjustment to desired pH values are listed below; pH 12 (1.46 g/l), pH 12.5 (3.09 g/l), pH 13.0 (8.0 g/l), pH 13.5 (30.57 g/l), pH 14 (65.97 g/l), pH 15 (400 g/l) and pH 16.0 (480 g/l), respectively in the temperature range of 18–20° C.

In the intercalation step, addition of potassium hydroxide (aqueous solution) or water may be made, while monitoring the pH of the slurry, if necessary, to maintain the slurry within the desired pH range.

The platy potassium titanate of the present invention such obtained have physical properties similar to those of fibrous potassium titanate, excepting the properties derived from its shape and crystal system. Like the fibrous potassium titanate, it is a stable and nontoxic compound.

Also like the fibrous potassium titanate, the platy potassium titanate, when incorporated in a resin, serves to enhance a tensile, flexural or other mechanical strength of the resin. Due to its platy shape, the platy potassium titanate is expected to provide other remarkable effects, including improvement of surface smoothness, realization of sliding properties, build-up of strength against a force exerted in a torsional direction and enhancement of Izod impact strength. Further, the platy potassium titanate is expected to offer a marked effect when applied to friction material for brakes, which will be described later.

The friction material of the present invention is characterized as containing the aforesaid platy potassium titanate of the present invention as a friction control agent.

The platy potassium titanate is preferably incorporated in the friction material in the amount of 3–50 weight %. The platy potassium titanate, if its amount falls below 3 weight %, may fail to improve frictional wear properties. On the other hand, if its amount exceeds 50 weight %, no further improvement of frictional wear properties can not be expected to result in an economical disadvantage.

Specifically, the friction material may comprise base fibers, a friction control agent and a binder, for example. To illustrate a formulation, 1–60 parts by weight of base fibers, 20–80 parts by weight of a friction control agent, 10–40 parts by weight of a binder, and 0–60 parts by weight of other components are incorporated in the friction material.

Examples of base fibers include resin fibers such as aramid fibers, metal fibers such as steel fibers and brass fibers, carbon fibers, glass fibers, ceramic fibers, rock wool, wood pulp and the like. These base fibers may be subjected to a surface treatment with an aminosilane, epoxysilane, vinylsilane or other silane coupling agent, titanate coupling agent or phosphate ester to improve their dispersibility and adhesion to binders.

Besides the platy potassium titanate, the friction material of the present invention may contain an additional friction control agent within the range that does not hinder the effect of the present invention. Examples of such friction control agents include organic powders such as natural and synthetic rubber powders, either vulcanized or unvulcanized, cashew resin powder, resin dust and rubber dust; inorganic powders such as carbon black, graphite powder, molybdenum disulfide, barium sulfate, calcium carbonate, clay, mica, talc, diatomite, antigorite, sepiolite, montmorillonite; zeolite, sodium trititanate, sodium pentatitanate and fibrous potassium titanate; metal powders such as copper, aliuminum, zinc and iron; and oxide powders such as alumina, silica, chrome oxide, titanium oxide and iron oxide.

Examples of binders include organic binders and inorganic binders. Examples of organic binders include thermosetting resins such as a phenol resin, formaldehyde resin, melamine resin, epoxy resin, acrylic resin, aromatic polyester resin and urea resin; elastomers such as a natural rubber, nitrile rubber, butadiene rubber, styrene-butadiene rubber, chloroprene rubber, polyisoprene rubber, acrylic rubber, high styrene rubber and styrene-propylene-diene copolymer; thermoplastic resins such as a polyamide resin, polyphenylenesulfide resin, polyether resin, polyimide resin, polyether ether ketone resin and thermoplastic liquid crystalline polyester resin; and the like. Examples of inorganic binders include alumina sol, silica sol, silicone resins and the like.

Other than the aforementioned components, the friction material of the present invention may further contain a rust inhibitor, lubricant, abrasive or other component, when needed.

The friction material of the present invention shows excellent and stable friction coefficient and wear resistance over a wide range from a low- to high-temperature range. Accordingly, its use for braking members, e.g., clutch facings, brake linings and disc pads, incorporated in braking devices as of automobiles, aircrafts, railway vehicles and industrial apparatuses not only improves and stabilizes their braking functions but also extends their service lives.

Due to the inclusion of the platy potassium titanate as a control agent, the friction material of the present invention shows the following actions and effects.

1) The friction control agent, because of its platy shape, imparts stable frictional wear properties to the friction material;

2) The friction material, because of its high aspect ratio, imparts enhanced strength to the friction material;

3) High fluidity of the friction control agent facilitates preparation of a raw mixture; and 4) The friction material has a high heat resistance and a friction coefficient stable over a wide temperature range from low to high temperatures.

EXAMPLES

The present invention is below described in more detail by way of examples.

Example 1

1. Synthesis of Platy Magnesium Potassium Titanate ($K_{0.8}Mg_{0.4}Ti_{1.6}O_4$)

13 kg of anatase titanium oxide, 6.06 kg of potassium carbonate, 2.46 kg of magnesium hydroxide and 8.48 kg of potassium chloride, together with 3 liters of water, were mixed thoroughly using a Henshel mixer and then pressed at a pressure of 19.6 Mpa (200 kgf/cm$^2$) into bricklike compacts each weighing about 3 kg.

These compacts were placed on a truck and transferred to a tunnel kiln where they were calcined. The calcination was performed according to the following schedule: those compacts were heated to 1050° C. at a rate of 5° C./min, maintained at the temperature for three hours, and finally cooled to a room temperature at a rate of 5° C./min.

The calcined compacts were crushed using a jaw crusher, ground to sizes of several nm and smaller using a pin mill, dispersed in water to form a 10% slurry, and then stirred by a propeller blade for one hour to effect disintegration. The slurry was classified by passing it through a 200-mesh screen (screen opening size of 75 $\mu$m). The powder particles left on the screen were classified by subjecing them again to wet disintegration. After a sequence of centrifugal filtration and drying, 15.46 kg of platy magnesium potassium titanate ($K_{0.8}Mg_{0.4}Ti_{1.6}O_4$, a mean major diameter of 4.6 $\mu$m and a mean aspect ratio of about 10). Its shape was confirmed from observation by a scattering electron microscope (SEM) and its identification was made by X-ray diffraction or X-ray fluorescence analysis. The mean major diameter (median diameter) was determined by a laser diffraction particle-size distribution analyzer.

2. Deintercalation by an Acid Treatment

The whole amount of the platy magnesium potassium titanate ($K_{0.8}Mg_{0.4}Ti_{1.6}O_4$) obtained in the previous step was dispersed in a solution prepared by allowing 15.68 kg of 70% sulfuric acid to dissolve in 293.52 liters of water to form a 5% slurry. This slurry was stirred by an impeller for about 5 hours, filtered, washed with water and dried. As a result, 11.97 kg of platy titanate ($H_2Ti_2O_5$) was obtained. The resulting platy titanate had almost the same shape as the platy magnesium potassium titanate. Its shape was confirmed by the SEM observation and its identification was performed by X-ray diffraction or X-ray fluorescence analysis. Its mean major diameter (median diameter) was determined by a laser diffraction particle-size distribution analyzer.

3. Intercalation of Potassium Ions by an Alkaline Treatment

The whole amount of the platy titanate obtained in the previous step was dispersed in 112.29 liters of water to form a 10% slurry. The slurry was stirred by an impeller for about 5 hours, during which time 85% potassium hydroxide was added to consistently keep the slurry at a pH of around 12. Thereafter, the slurry was filtered, washed with water and dried at 110° C. for 2 hours. In total, 741 g of 85% potassium hydroxide was added.

4. Synthesis of Platy Potassium Octatitanate

Figure 1:
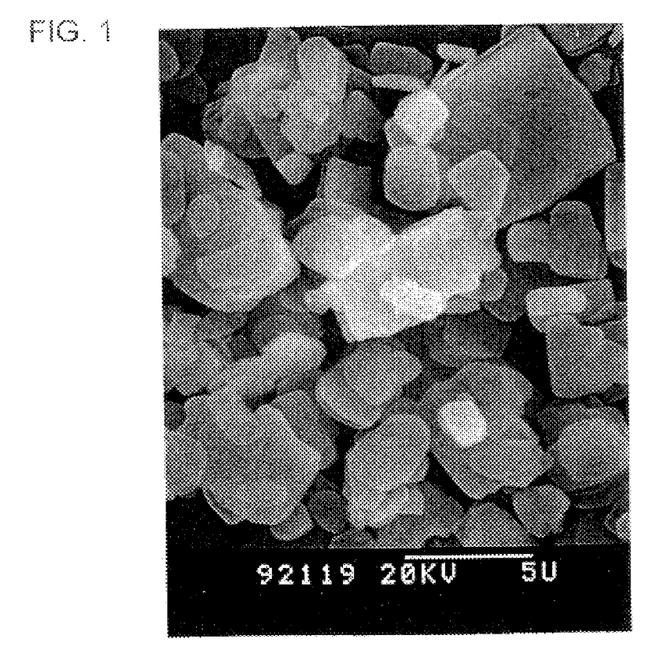
FIG. 1 is a photomicrograph of platy potassium octatitanate produced in Example 1 when taken by a scanning electron microscope (at 5,000×magnification)
Figure 4:
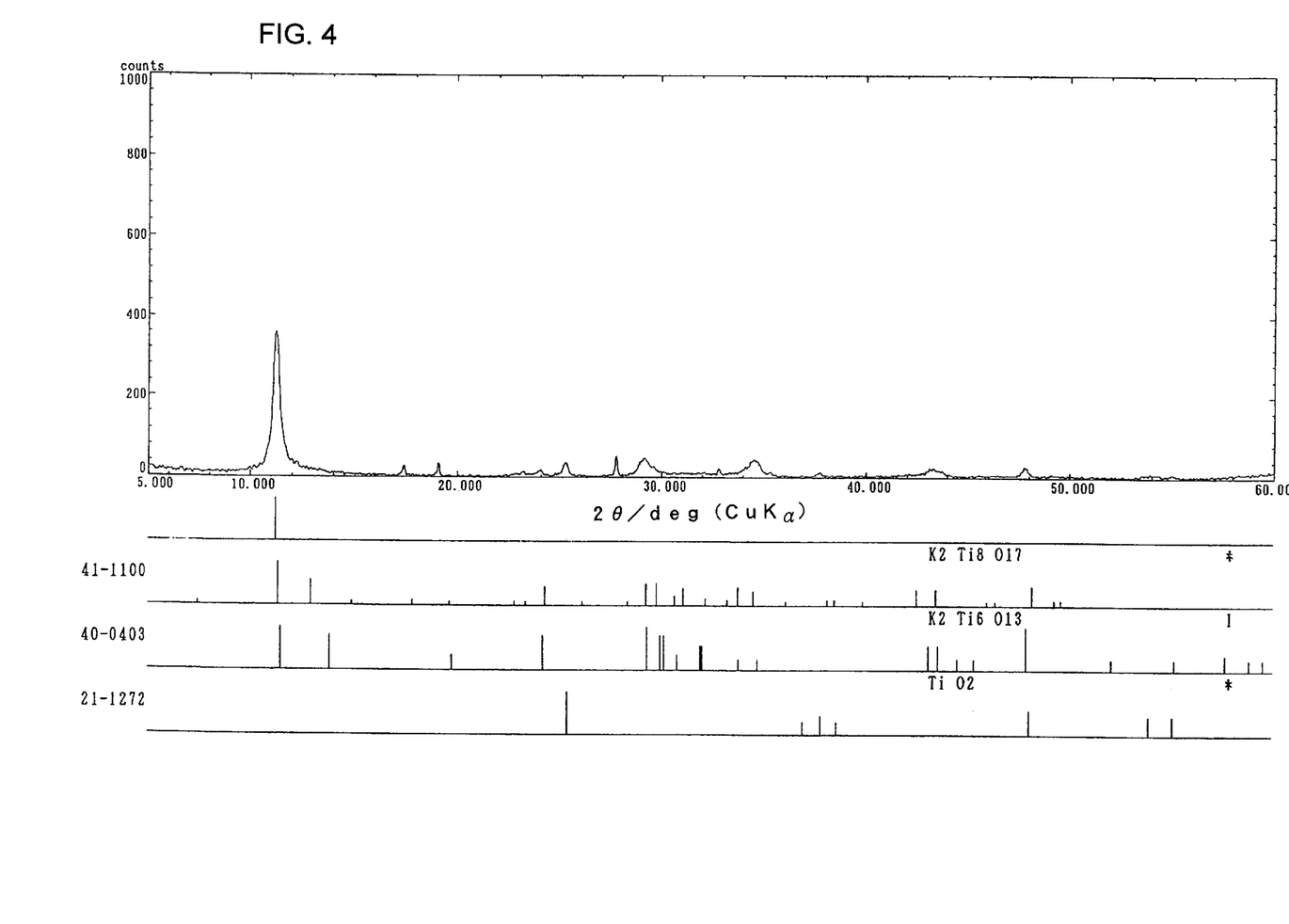
FIG. 4 is an X-ray diffraction chart of platy potassium octatitanate obtained in Example 1.
Figure 5:
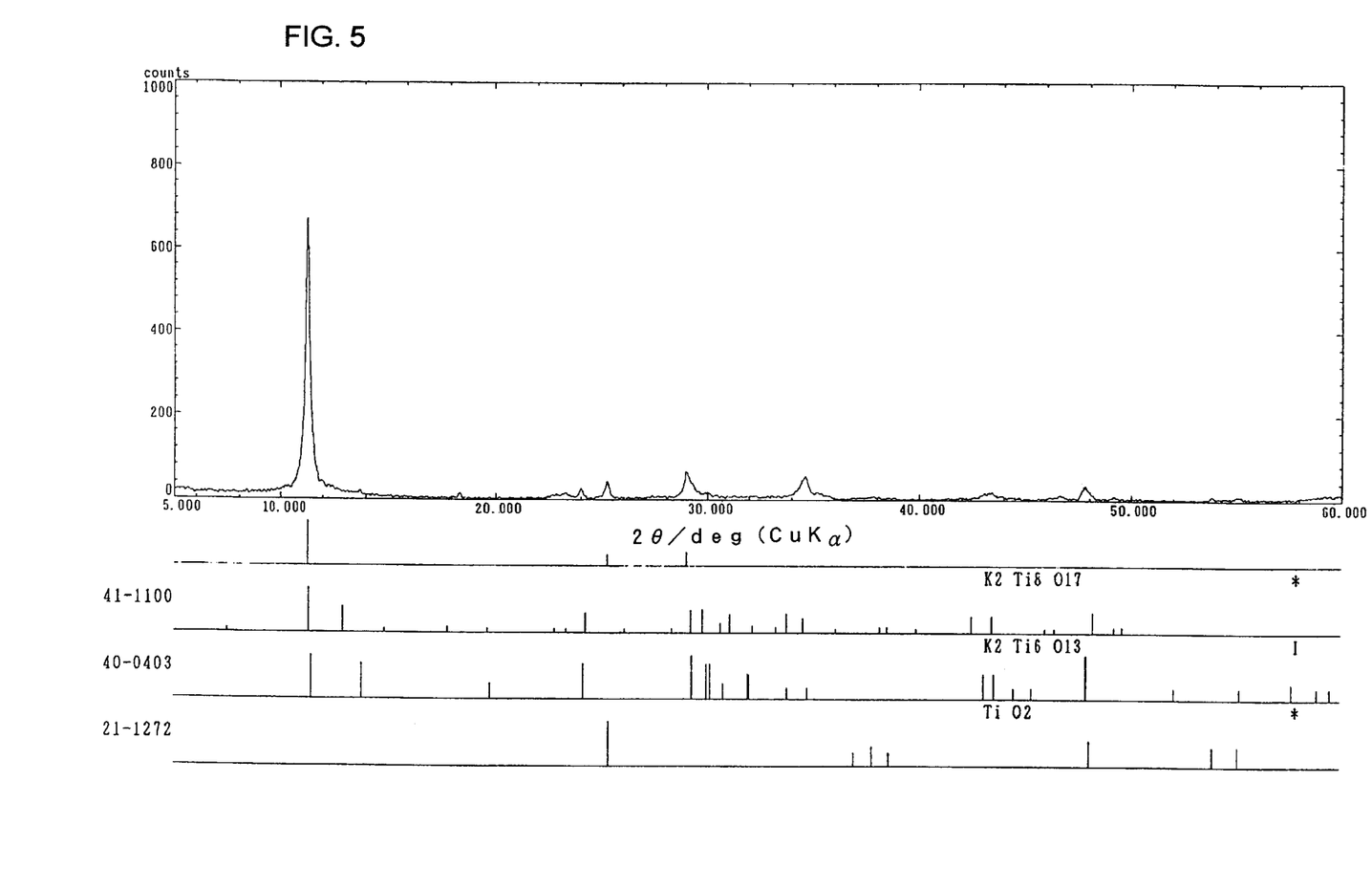
FIG. 5 is an X-ray diffraction chart of platy potassium octatitanate obtained in Example 2.

Next, the resultant was calcined in an electric furnace at 500° C. for 3 hours to obtain 13.36 kg of platy potassium octatitanate (a mean major diameter of 4.2 $\mu$m and a mean aspect ratio of about 10). Its shape was confirmed by the SEM observation and its identification was made by X-ray diffraction or X-ray fluorescence analysis. The mean major diameter (median diameter) was determined by a laser diffraction particle-size distribution analyzer. The mean minor diameter was determined by the SEM observation. FIG. 1 is an SEM photomicrograph of the platy potassium octatitanate obtained. FIG. 4 is an X-ray diffraction chart of the platy potassium octatitanate obtained.

Example 2

Figure 2:
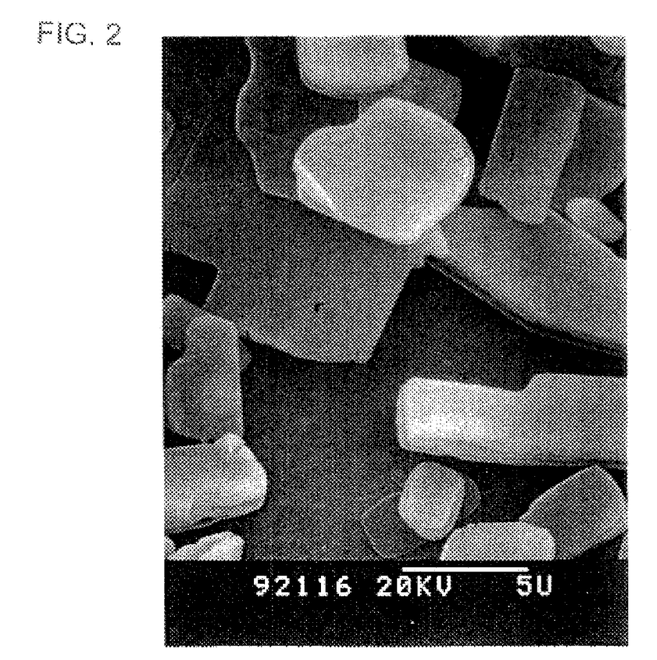
FIG. 2 is a photomicrograph of platy potassium octatitanate produced in Example 2 when taken by a scanning electron microscope (at 5,000×magnification)

The procedure of Example 1 was followed, except that lithium potassium ($K_{0.8}Li_{0.27}Ti_{1.73}O_4$) with a mean major diameter of 9 $\mu$m and a mean aspect ratio of about 10 was used as raw material, to produce platy potassium octatitanate. The resulting platy potassium octatitanate was found to have a mean major diameter of 9.4 $\mu$m and a mean aspect ratio of about 10. Its shape was confirmed by the SEM observation and its identification was made by X-ray diffraction or X-ray fluorescence analysis. Its mean major diameter (median diameter) was determined by a laser diffraction particle-size distribution analyzer and its mean minor diameter was determined by the SEM observation. FIG. 2 is an SEM photomicrograph of the platy potassium octatitanate obtained. FIG. 4 is an X-ray diffraction chart of the platy potassium octatitanate obtained.

Example 3

Platy lithium potassium titanate represented by $K_{0.8}Li_{0.2}Ti_{1.8}O_4$ was made into platy titanate by subjecting it to an acid treatment by hydrochloric acid. This platy titanate was dispersed in a saturated, aqueous KOH solution which was subsequently adjusted to a pH of about 12 and stirred for 2 hours. After isolation by filtration, the isolated solids was calcined at 60° C. for 2 hours. As a result, platy potassium octatitanate was obtained.

Example 4

20 parts by weight of the platy potassium octatitanate (with a mean major diameter of 50–60 μm, a mean minor diameter (thickness) of 0.3 μm and a mean aspect ratio of about 180–200), 10 parts by weight of aramid fibers (product name "Kevlar Pulp", a mean fiber length of 3 mm, manufactured by Toray Co., Ltd.), 20 parts by weight of a binder (phenol resin) and 50 parts by weight of barium sulfate were mixed. The mixed raw material was pressed provisionally at a pressure of 300 kgf/cm$^2$ at ambient temperature for one minute, integrated in a mold (at a pressure of of 150 kgf/cm$^2$ at 170° C. for 5 minutes) and then subjected to a heat treatment (at 180° C. for 3 hours). After removal from the mold, the product was subjected to abrasive machining. As a result, a test disc pad A (JIS D 4411 test piece) was obtained.

The friction control agent was found to exhibit good fluidity and permit easy preparation of the raw mixture.

Example 5

1. Synthesis of Platy Magnesium Potassium Titanate ($K_{0.8}Mg_{0.4}Ti_{1.6}O_4$)

14.73 kg of anatase titanium oxide powder, 6.38 kg of potassium carbonate, 2.79 kg of magnesium hydroxide and 10.03 kg of potassium chloride, together with 2 liters of water, were mixed thoroughly using a Henshel mixer and then pressed at a pressure of 19.6 Mpa (200 kgf/cm$^2$) into bricklike compacts each weighing about 3 kg.

These compacts were placed on a truck and transferred to a tunnel kiln where they were calcined. The calcination was carried out according to the following schedule: those compacts were heated to 1050° C. at a rate of 5° C./min, maintained at the temperature for three hours, and finally cooled to a room temperature at a rate of 5° C./min.

The calcined compacts were crushed using a jaw crusher, ground to sizes of several nm and smaller using a pin mill, dispersed in water to form a 10% slurry, and then stirred by a propeller blade for one hour to effect disintegration. The slurry was classified by passing it through a 200-mesh screen (screen opening size of 75 μm). The powder particles left on the screen were classified by subjecing them again to wet disintegration. After a sequence of centrifugal filtration and drying, 17.80 kg of platy magnesium potassium titanate ($K_{0.8}Mg_{0.4}Ti_{1.6}O_4$, a mean major diameter of 4.6 μm and a mean aspect ratio of about 10). Its shape was confirmed from observation by a scattering electron microscope (SEM) and its identification was made by X-ray diffraction or X-ray fluorescence analysis. The mean major diameter (median diameter) was determined by a laser diffraction particle-size distribution analyzer.

2. Deintercalation by an Acid Treatment

The whole amount of the platy magnesium potassium titanate ($K_{0.8}Mg_{0.4}Ti_{1.6}O_4$) obtained in the previous step was dispersed in a solution prepared by allowing 36.1 kg of 35% sulfuric acid to dissolve in 141.9 liters of water to form a 10% slurry. This slurry was stirred by an impeller for about 5 hours, filtered, washed with water and dried. As a result, 12.03 kg of platy titanate ($H_2Ti_2O_5$) was obtained. The resulting platy titanate had almost the same shape as the platy magnesium potassium titanate. Its shape was confirmed by the SEM observation and its identification was made by X-ray diffraction or X-ray fluorescence analysis. Its mean major diameter (median diameter) was determined by a laser diffraction particle-size distribution analyzer.

3. Intercalation of Potassium Ions by an Alkaline Treatment

The whole amount of the platy titanate obtained in the previous step was dispersed in 114.4 liters of water to form a 10% slurry. The slurry was stirred by an impeller for about 5 hours, during which time 85% potassium hydroxide was added to keep the slurry consistently at a pH of around 13.75. Thereafter, the slurry was filtered, washed with water and dried at 110° C. for 2 hours. In total, 6.99 kg of 85% potassium hydroxide was added.

4. Synthesis of Platy Potassium Hexatitanate

Figure 3:
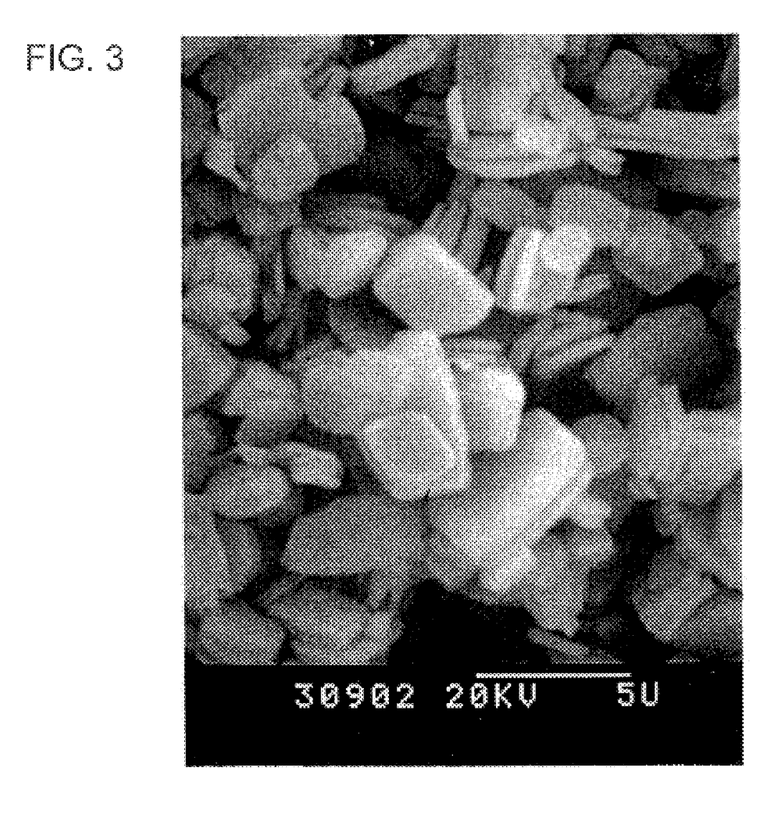
FIG. 3 is a photomicrograph of platy potassium hexatitanate produced in Example 5 when taken by a scanning electron microscope (at 5,000×magnification)
Figure 6:
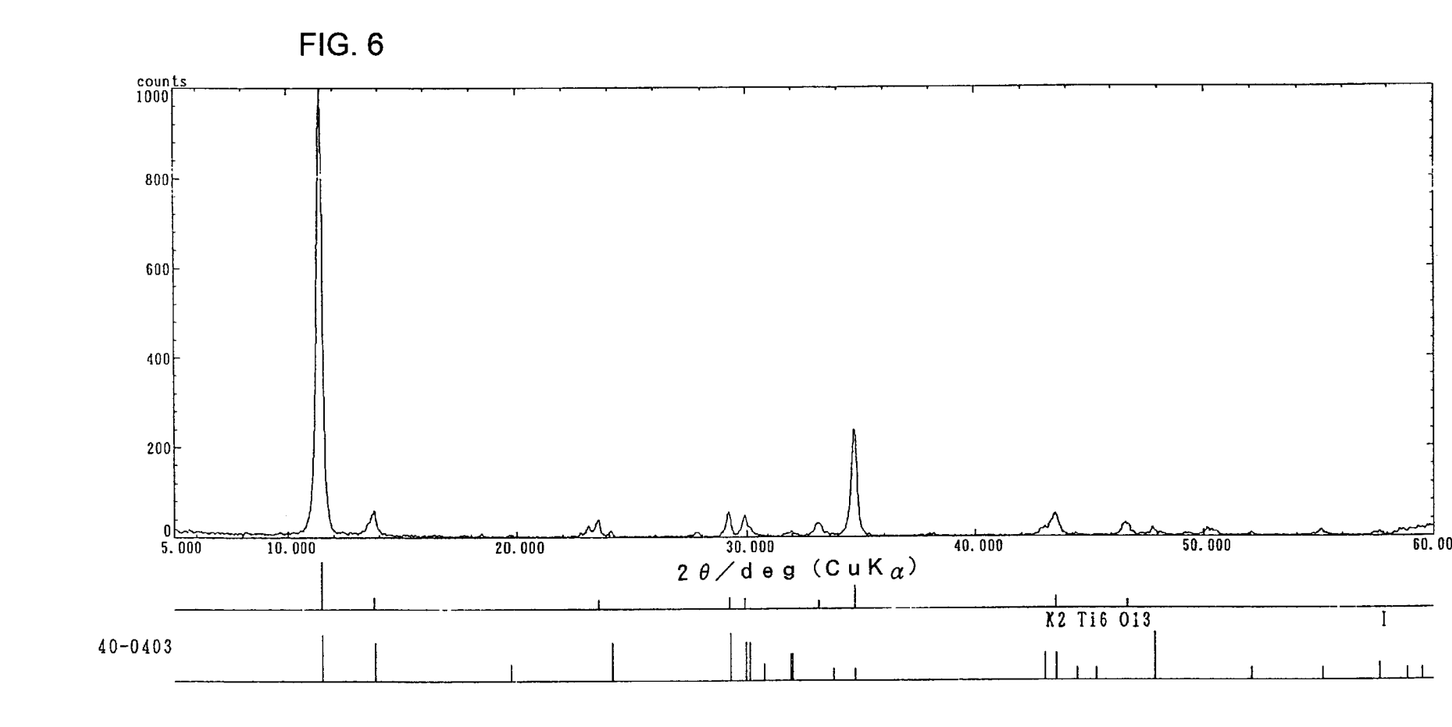
In FIG. 6 is an X-ray diffraction chart of platy potassium hexatitanate obtained in Example 5.

Next, the resultant was calcined in an electric furnace at 700° C. for 3 hours to obtain 13.87 kg of platy potassium hexatitanate (with a mean major diameter of 4.2 μm and a mean aspect ratio of about 10). Its shape was confirmed by the SEM observation and its identification was made by X-ray diffraction or X-ray fluorescence analysis. The mean major diameter (median diameter) was determined by a laser diffraction particle-size distribution analyzer. The mean minor diameter was determined by the SEM observation. FIG. 3 is an SEM photomicrograph of the platy potassium hexatitanate obtained. FIG. 6 is an X-ray diffraction chart of the platy potassium hexatitanate obtained.

Example 6

Figure 7:
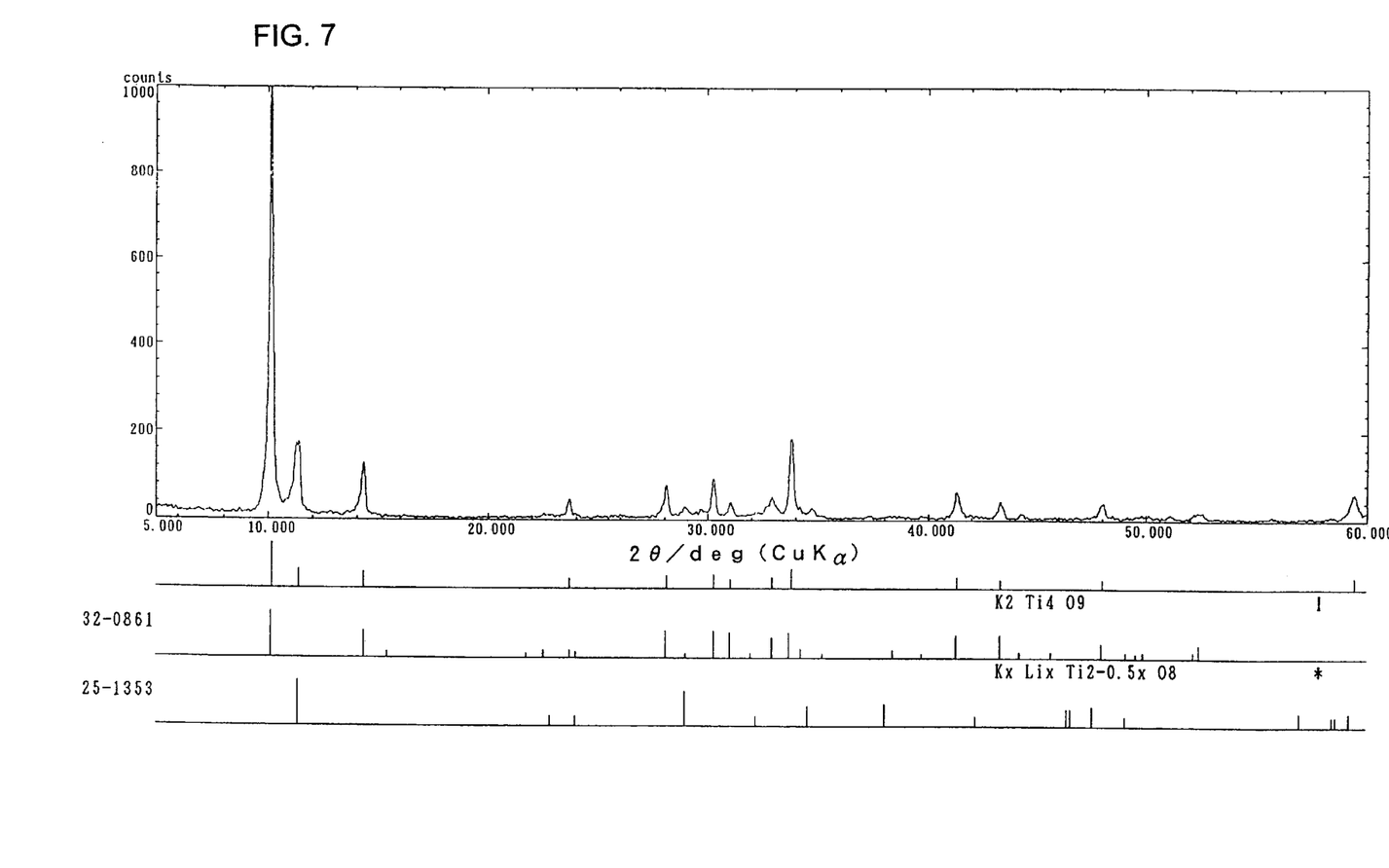
FIG. 7 is an X-ray diffraction chart of platy potassium tetratitanate obtained in Example 6.

Platy potassium tetratitanate was produced using the platy titanate obtained in step 2 of Example 5. Specifically, 50 g of the platy titanate was dispersed in 800 ml of a 40% aqueous solution of potassium hydroxide, followed by 24 hours of stirring by a propeller blade at 500 rpm. During the stirring, the slurry was maintained consistently at a pH of around 15. This slurry was then filtered by a suction filter. The resultant filter cake was dried at 110° C. and then calcined in an electric furnace at 800° C. for 2 hours. The temperature was raised at a rate of 5° C./min. The powder obtained was identified as potassium tetratitanate by X-ray diffraction and X-ray fluorescence analysis. Its mean major diameter (median diameter) was determined by a laser diffraction particle-size distribution analyzer and its mean minor diameter was observed by an SEM. The results revealed a mean major diameter of 3.5 μm and a mean aspect ratio of about 15 for the powder obtained. FIG. 7 is an X-ray diffraction chart of the platy potassium tetratitanate obtained.

Example 7

20 parts by weight of the platy potassium hexatitanate obtained in Example 5, 10 parts by weight of aramid fibers (product name "Kevlar Pulp", a mean fiber length of 3 mm, manufactured by Toray Co., Ltd.), 20 parts by weight of a binder (phenol resin) and 50 parts by weight of barium sulfate were mixed. The resulting raw mixture was pressed provisionally at a pressure of 300 kgf/cm² at ambient temperature for one minute, integrated in a mold (at a pressure of of 150 kgf/cm² at 170° C. for 5 minutes) and then subjected to a heat treatment (at 180° C. for 3 hours). After removal from the mold, the product was subjected to abrasive machining. As a result, a test disc pad A (JIS D 4411 test piece) was obtained.

The friction control agent was found to exhibit good fluidity and permit easy preparation of the raw mixture.

Example 8

20 parts by weight of the platy potassium tetratitanate obtained in Example 6, 10 parts by weight of aramid fibers (product name "Kevlar Pulp", a mean fiber length of 3 mm, manufactured by Toray Co., Ltd.), 20 parts by weight of a binder (phenol resin) and 50 parts by weight of barium sulfate were mixed. The resulting raw mixture was pressed provisionally at a pressure of 300 kgf/cm² at ambient temperature for one minute, integrated in a mold (at a pressure of 150 kgf/cm² at 170° C. for 5 minutes) and then subjected to a heat treatment (at 180° C. for 3 hours). After removal from the mold, the product was subjected to abrasive machining. As a result, a test disc pad A (JIS D 4411 test piece) was obtained.

The friction control agent was found to exhibit good fluidity and permit easy preparation of the raw mixture.

Utility in Industry

The platy potassium titanate of the present invention, when incorporated in a resin, serves to enhance a tensile, flexural or other mechanical strength of the resin. Due to its platy shape, the platy potassium titanate is expected to provide other remarkable effects, including improvement of surface smoothness, realization of sliding properties, build-up of strength against a force exerted in a torsional direction and enhancement of Izod impact strength. Also, the platy potassium titanate of the present invention, when used as a friction control material for incorporation in friction materials, exhibits good fluidity and permit easy preparation of the raw mixture. Further, a friction material containing such a platy potassium titanate of the present invention as a friction control material shows a high heat resistance and a friction coefficient stable over a wide temperature range from low to high temperatures.

What is claimed is:

1. Platy potassium octatitanate having a mean major diameter of 1–100 μm and a mean aspect ratio (mean major diameter/mean minor diameter (thickness)) of 3–500.

2. The platy potassium octatitanate as recited in claim 1, having a mean major diameter of 1–100 μm and a mean aspect ratio (mean major diameter/mean minor diameter (thickness)) of 3–100.

3. A process for producing platy potassium octatitanate characterized in that platy titanate is immersed in a potassium hydroxide solution at a pH of not less than 11.5 but below 13 and then calcined.

4. The process for producing platy potassium octatitanate as recited in claim 3, characterized in that the platy potassium octatitanate is prepared by subjecting platy magnesium or lithium potassium titanate to an acid treatment.

5. The process for producing platy potassium octatitanate as recited in claim 3, wherein calcination is achieved at a temperature of 400–700° C.

6. The process for producing platy potassium octatitanate as recited in claim 3, wherein calcination is achieved at a temperature of 400–650°.

7. A friction material comprising the platy potassium octatitanate as recited in claim 1 as a friction control agent.

8. The friction material as recited in claim 7, characterized in that the platy potassium octatitanate is contained in the amount of 3–50% by weight.

9. Platy potassium hexatitanate having a mean major diameter of 1–100 μm and a mean aspect ratio (mean major diameter/mean minor diameter (thickness)) of 3–500.

10. A process for producing platy potassium hexatitanate characterized in that platy titanate is immersed in a potassium hydroxide solution at a pH of not less than 13.5 but below 14 and then calcined.

11. The process for producing platy potassium hexatitanate as recited in claim 10, characterized in that the platy potassium hexatitanate is prepared by subjecting platy magnesium or lithium potassium titanate to an acid treatment.

12. The process for producing platy potassium hexatitanate as recited in claim 10, wherein calcinations is achieved at a temperature of 600–800° C.

13. A friction material comprising the platy potassium hexatitanate as claimed in claim 9 as a friction control agent.

14. The friction material as recited in claim 13, characterized in that the platy potassium hexatitanate is contained in the amount of 3–50% by weight.

15. Platy potassium tetratitanate having a mean major diameter of 1–100 μm and a mean major aspect ratio (mean major diameter/mean minor diameter (thickness)) of 3–500.

16. A process for producing platy potassium tetratitanate characterized in that platy titanate is immersed in a potassium hydroxide solution at a pH of not less than 14.5 but below 16.3 and then calcined.

17. The process for producing platy potassium tetratitanate as recited in claim 16, characterized in that the platy potassium tetratitanate is prepared by subjecting platy magnesium or lithium potassium titanate to an acid treatment.

18. The process for producing platy potassium tetratitanate as recited in claim 16, wherein calcinations is achieved at a temperature of 700–800° C.

19. A friction material comprising the platy potassium tetratitanate of claim 15 as a friction control agent.

20. The friction material as recited in claim 19, characterized in that the platy potassium tetratitanate is contained in the amount of 3–50% by weight.

21. The process for producing platy potassium octatitanate as recited in claim 4, wherein calcination is achieved at a temperature of 400–700° C.

22. The process for producing platy potassium octatitanate as recited in claim 4, wherein calcination is achieved at a temperature of 400–650° C.

23. A friction material comprising the platy potassium octatitanate as claimed in claim 2, as a friction control agent.

24. A friction material comprising the platy potassium octatitanate produced by the process as claimed in claim 3, as a friction control agent.

25. A friction material comprising the platy potassium octatitanate produced by the process as claimed in claim 4, as a friction control agent.

26. A friction material comprising the platy potassium octatitanate produced by the process as claimed in claim 5, as a friction control agent.

27. A friction material comprising the platy potassium octatitanate produced by the process as claimed in claim 6, as a friction control agent.

28. The process for producing platy potassium hexatitanate as claimed in claim 11, wherein calcination is achieved at a temperature of 600–800° C.

29. A friction material comprising the platy potassium hexatitanate produced by the process as claimed in claim 10, as a friction control agent.

30. A friction material comprising the platy potassium hexatitanate produced by the process as claimed in claim 11, as a friction control agent.

31. A friction material comprising the platy potassium hexatitanate produced by the process as claimed in claim 12, as a friction control agent.

32. The process for producing platy potassium tetratitanate as claimed in claim 17, wherein calcination is achieved at a temperature of 700–800° C.

* * * * *